(12) United States Patent
Oikawa et al.

(10) Patent No.: US 7,912,326 B2
(45) Date of Patent: Mar. 22, 2011

(54) OPTICAL CONTROL DEVICE

(75) Inventors: Satoshi Oikawa, Chiyoda-ku (JP);
Junichiro Ichikawa, Chiyoda-ku (JP);
Yuhki Kinpara, Chiyoda-ku (JP); Yuji Yamane, Chiyoda-ku (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 16 days.

(21) Appl. No.: 12/450,464

(22) PCT Filed: Mar. 28, 2008

(86) PCT No.: PCT/JP2008/056087
§ 371 (c)(1),
(2), (4) Date: Sep. 28, 2009

(87) PCT Pub. No.: WO2008/120719
PCT Pub. Date: Sep. 10, 2008

(65) Prior Publication Data
US 2010/0046881 A1    Feb. 25, 2010

(30) Foreign Application Priority Data
Mar. 30, 2007    (JP) ................................. 2007-095118

(51) Int. Cl.
*G02F 1/035* (2006.01)
(52) U.S. Cl. ...................... 385/2; 385/3; 385/8; 359/245
(58) Field of Classification Search ........................ 385/2
See application file for complete search history.

(56) References Cited

U.S. PATENT DOCUMENTS

| | | |
|---|---|---|
| 5,408,566 A | 4/1995 | Eda et al. |
| 5,790,719 A | 8/1998 | Mitomi et al. |
| 6,580,843 B2 | 6/2003 | Doi et al. |
| 2003/0044100 A1 | 3/2003 | Kondo et al. |
| 2003/0138180 A1 | 7/2003 | Kondo et al. |
| 2004/0264832 A1 | 12/2004 | Kondo et al. |
| 2005/0047703 A1* | 3/2005 | Mitomi et al. .................... 385/2 |

(Continued)

FOREIGN PATENT DOCUMENTS

DE    196 49 441 A1    6/1997

(Continued)

OTHER PUBLICATIONS

International Preliminary Report on Patentability issued in International Application No. PCT/JP2008/056087; Issued on Oct. 13, 2009.

*Primary Examiner* — Hemang Sanghavi
(74) *Attorney, Agent, or Firm* — Oliff & Berridge, PLC

(57) ABSTRACT

A light control element is provided with a thin board having electro-optical effects; an optical waveguide formed on the thin board; and a control electrode for controlling light that passes through the optical waveguide. The light control element performs speed matching between a microwave signal applied to the control electrode and the light, impedance matching of the microwaves, reduction of a driving voltage and high speed operation. In the control electrode of the light control element, a signal electrode and a grounding electrode are arranged on an upper side of the thin board, and on a lower side of the thin board, a second electrode including the grounding electrode is arranged. The second electrode is arranged not to exist below the signal electrode, especially for achieving impedance matching.

9 Claims, 10 Drawing Sheets

U.S. PATENT DOCUMENTS

| | | |
|---|---|---|
| 2006/0029319 A1 | 2/2006 | Sugiyama |
| 2008/0069491 A1* | 3/2008 | Kissa et al. .................. 385/2 |
| 2010/0195953 A1* | 8/2010 | Miyatake et al. ............ 385/14 |

FOREIGN PATENT DOCUMENTS

| | | |
|---|---|---|
| EP | 1 291 706 A2 | 3/2003 |
| EP | 1 315 021 A2 | 5/2003 |
| EP | 1 455 219 A1 | 9/2004 |
| JP | A-62-173428 | 7/1987 |
| JP | A-64-018121 | 1/1989 |
| JP | A-05-093892 | 4/1993 |
| JP | A-06-289341 | 10/1994 |
| JP | A-10-039266 | 2/1998 |
| JP | A-2002-182173 | 6/2002 |
| JP | A-2003-156723 | 5/2003 |
| JP | A-2003-215519 | 7/2003 |
| JP | A-2004-004589 | 1/2004 |
| JP | B2-3638300 | 1/2005 |
| JP | A-2006-047746 | 2/2006 |
| JP | A-2006-243327 | 9/2006 |
| WO | WO 2007/114367 A1 | 10/2007 |

* cited by examiner

OPTICAL CONTROL DEVICE

TECHNICAL FIELD

The present invention relates to an optical control device and, particularly, to an optical control device which includes a sheet-like substrate having an electro-optical effect and having a thickness of 10 µm or less, an optical waveguide formed in the sheet-like substrate, and a control electrode for controlling light which passes through the optical waveguide.

BACKGROUND ART

Conventionally, in the field of optical communication or optical measurement, various optical control devices such as a waveguide type optical modulator and a waveguide type optical switch, where an optical waveguide and a control electrode is formed on a substrate having an electro-optical effect, have become commercially available. Many of the optical control devices which are currently being used are configured to include an optical waveguide 2, a signal electrode 4 and a ground electrode 5 which are formed on an electro-optical crystal substrate 1 having a thickness of about 0.5 to 1 mm, as illustrated in FIG. 1. FIG. 1 illustrates an example of an optical modulator that uses a Z-cut $LiNbO_3$ substrate, in which reference numeral 3 indicates a buffer layer such as $SiO_2$ film.

Specifically, in the waveguide type optical modulator, a microwave signal is applied to the control electrode in order to control and modulate an optical wave propagating through the optical waveguide. Therefore, there is a need for achieving an impedance matching between the control electrode in the optical modulator and a signal path, such as a coaxial cable which introduces microwaves into the optical modulator, in order to allow the microwave to propagate effectively in the control electrode. For this reason, as illustrated in FIG. 1, a type of control electrode where a signal electrode 4 is interposed between ground electrodes 5, that is, a so-called coplanar control electrode has been used.

However, in the case of the coplanar control electrode, since an external electric field does not operate efficiently in a direction (corresponding to a vertical direction in the case of the Z-cut $LiNbO_3$ substrate illustrated in FIG. 1) where efficiency of the electro-optical effect of the substrate 1 is high, a larger voltage is required in order to obtain a required optical modulation degree. Concretely, when a $LiNbO_3$ substrate (hereinafter referred to as an "LN substrate") is used and an electrode length along the optical waveguide is 1 cm, a half-wavelength voltage of about 10 to 15 V is required.

As illustrated in FIG. 2, Patent Document 1 discloses a configuration in which the optical waveguide is formed of a ridged waveguide 20, and the ground electrodes 5, 51, and 52 are disposed closer to the signal electrodes 4 and 41 in order to enhance an optical confinement factor of the optical waveguide and to more efficiently apply an electric field generated by the control electrode to the optical waveguide. According to this configuration, it is possible to realize a reduction in driving voltage to some degree but it is essential to reduce the driving voltage much more in order to realize a high-speed modulation in a high frequency band.

In addition, as illustrated in FIG. 3, Patent Document 2 discloses that the substrate is interposed between the control electrodes, and the electric field is applied in a direction (corresponding to a vertical direction in the case of the Z-cut $LiNbO_3$ substrate illustrated in FIG. 3) where the efficiency of the electro-optical effect is high. Moreover, the optical modulator illustrated in FIG. 3 polarizes reversely the substrate having the electro-optical effect, and forms substrate regions 10A and 10B in which the spontaneous polarization directions (indicated by the arrows in FIG. 3) are different from each other, and the optical waveguide 2 is formed in each of the substrate regions. When the electric field is applied to each optical waveguide by the common signal electrode 42 and the ground electrode 53, it is possible to generate a phase change for the optical waves propagating in the corresponding optical waveguides. Using this differential driving, it is possible to reduce the driving voltage much more.

However, in the electrode structure illustrated in FIG. 3, the refractive index of the microwave becomes high, and thus it is difficult to realize a velocity matching between the optical wave which is propagating in the optical waveguide and the microwave which is a modulation signal. Moreover, since the impedance is reduced to the contrary, there is the drawback in that it is difficult to achieve the impedance matching with the signal path of the microwave.

On the other hand, in the following Patent Document 3 or 4, an optical waveguide and a modulation electrode are formed integrally in a very thin substrate which has a thickness of 30 µm or less (the substrate will be referred to as a "sheet-like substrate") and another substrate which has a lower dielectric constant than the sheet-like substrate is bonded to the sheet-like substrate, thereby lowering an effective refractive index with respect to the microwave and achieving the velocity matching between the microwave and the optical wave.

However, even when the control electrode having the structure as illustrated in FIGS. 1 to 3 is formed in the optical modulator that uses such a sheet-like substrate, the above-mentioned problems still have fundamentally not been resolved. When the substrate is interposed between the control electrodes illustrated in FIG. 3, the refractive index of the microwave tends to decrease if the thickness of the substrate is thin, but it is difficult to realize the velocity matching between the optical wave and the microwave. When a sheet-like substrate made of LN is used for example, the effective refractive index is about 5 in accordance with the width of the electrode, which is far lower than an optimal value of 2.14. On the other hand, the impedance tends to decrease as the substrate becomes thinner, which causes a mismatching in impedance to be large.

Patent Document 1: U.S. Pat. No. 6,580,843
Patent Document 2: Japanese Patent No. 3638300
Patent Document 3: JP-A 64-18121 (KOKAI)
Patent Document 4: JP-A 2003-215519 (KOKAI)
Patent Document 5: JP-A 6-289341 (KOKAI)

DISCLOSURE OF THE INVENTION

Problems to be Solved by the Invention

The present invention is directed to solve such problems and an object of the present invention is to provide an optical control device capable not only of achieving a velocity matching between a microwave and an optical wave and an impedance matching of the microwave, especially the impedance matching between a signal path such as a coaxial cable for introducing the microwave into an optical modulator and a control electrode of the optical modulator, but also achieving a reduction in driving voltage.

Another object of the present invention is to provide an optical control device which can operate stably and suppress a rise in temperature of the optical control device owing to the reduction in driving voltage, and further to provide an optical control device which can use a low-driving-voltage driving device which is inexpensive.

Means for Solving the Problems

In order to solve the above-mentioned problems, according to the invention of claim 1, there is provided an optical control device including: a sheet-like substrate which has an electro-optical effect and has a thickness of 10 μm or less; an optical waveguide formed at the sheet-like substrate; and a control electrode for controlling light propagating in the optical waveguide, wherein the control electrode is comprised of a first electrode and a second electrode which are arranged so as to interpose the sheet-like substrate so that the first electrode includes a coplanar electrode which is composed of at least a signal electrode and a ground electrode and the second electrode is configured to include at least a ground electrode in a modulation region so as to apply an electric field to the optical waveguide in cooperation with the signal electrode of the first electrode, wherein the second electrode is not disposed in at least a lower portion of the signal electrode of the first electrode in a signal input/output portion of the optical control device.

According to the invention of claim 2, the sheet-like substrate is supported on a supporting substrate via a low dielectric constant layer; and an additional ground electrode is disposed in the signal input/output portion via the low dielectric constant layer at a position which is away from the second electrode toward the supporting substrate. As a result, the second electrode can function as the ground electrode, and impedance adjustment can be performed easily. Moreover, such a ground electrode has an effect that shields an electrical signal from the outside and is thus not likely to be subject to the outside connection state (a chip mounting state or the like).

The distance between the second electrode and the additional ground electrode may be set to 50 μm or more, for example (claim 3).

According to the invention of claim 4, there is provided an optical control device including: a sheet-like substrate which has an electro-optical effect and has a thickness of 10 μm or less; an optical waveguide formed on the sheet-like substrate; and a control electrode for controlling light propagating in the optical waveguide, wherein the control electrode is comprised of a first electrode and a second electrode which are arranged so as to interpose the sheet-like substrate so that the first electrode includes a coplanar electrode which is composed of at least a signal electrode and a ground electrode and the second electrode is configured to include at least a ground electrode in a modulation region of the optical control device so as to apply an electric field to the optical waveguide in cooperation with the signal electrode of the first electrode, wherein the second electrode is disposed in the signal input/output portion of the optical control device via a low dielectric constant layer at a position which is away from the sheet-like substrate toward the supporting substrate.

According to the invention of claim 5, the optical control device according to any one of claims 1 to 4 is characterized in that the optical waveguide is a ridged optical waveguide.

According to the invention of claim 6, the optical control device according to any one of claims 1 to 5 is characterized in that a buffer layer is formed at least between the sheet-like substrate and the first electrode.

According to the invention of claim 7, the optical control device according to any one of claims 1 to 6 is characterized in that in the first electrode and the second electrode, the signal electrode and the ground electrode are configured by either a transparent electrode or an electrode where a transparent electrode is disposed on the sheet-like substrate.

According to the invention of claim 8, the optical control device according to any one of claims 5 to 7 is characterized in that a low dielectric constant film is filled in recesses which are disposed on at least both sides of the ridged waveguide.

According to the invention of claim 9, the optical control device according to any one of claims 1 to 8 is characterized in that a spontaneous polarization of the sheet-like substrate including at least a portion of the optical waveguide is reversed.

EFFECTS OF THE INVENTION

According to the invention of claim 1, the optical control device includes the sheet-like substrate which has an electro-optical effect and has a thickness of 10 μm or less; the optical waveguide formed on the sheet-like substrate; and the control electrode for controlling light propagating in the optical waveguide. The control electrode is comprised of a first electrode and a second electrode which are arranged so as to interpose the sheet-like substrate. The first electrode includes a coplanar electrode which is composed of at least a signal electrode and a ground electrode. The second electrode is configured to include at least a ground electrode in a modulation region portion so as to apply an electric field to the optical waveguide in cooperation with the signal electrode of the first electrode. Therefore, it is possible to provide an optical control device capable not only of achieving a velocity matching between the microwave and the optical wave and an impedance matching of the microwaves but also operating at a high speed.

Moreover, the second electrode is configured not to include any electrode in at least a lower portion of the signal electrode of the first electrode in the signal input/output portion of the optical control device. In this case, due to the non-existence of the electrode, the electrostatic capacitance of the control electrode in the signal input/output portion increases, resulting in the increase in impedance and the impedance matching between the control electrode in the optical modulator and the signal path such as a coaxial cable that introduces microwaves into the optical control device.

Moreover, it is possible to provide the optical control device which can operate stably and suppress a rise in temperature of the optical control device owing to the above-mentioned reduction in driving voltage, and further to provide the optical control device which can use a low-driving-voltage driving device which is inexpensive.

According to the inventions of claims 2 and 3, the sheet-like substrate is supported on the supporting substrate via the low dielectric constant layer; and the additional ground electrode is disposed in the signal input/output portion via the low dielectric constant layer at a position which is away from the second electrode toward the supporting substrate. As a result, the second electrode can function as the ground electrode, and an impedance adjustment can be performed easily. Moreover, such a ground electrode has an effect that shields an electrical signal from the outside and is thus not likely to be subject to the outside connection state (a chip mounting state or the like).

According to the invention of claim 4, the optical control device includes the sheet-like substrate which has an electro-optical effect and has a thickness of 10 μm or less; the optical waveguide formed on the sheet-like substrate; and the control electrode for controlling light propagating in the optical waveguide. The control electrode is comprised of a first electrode and a second electrode which are arranged so as to interpose the sheet-like substrate. The first electrode includes a coplanar electrode which is composed of at least a signal electrode and a ground electrode. The second electrode is configured to include at least a ground electrode in a modulation region portion of the optical control device so as to apply an electric field to the optical waveguide in cooperation with the signal electrode of the first electrode. The second electrode is disposed in the signal input/output portion via a low dielectric constant layer at a position which is away from the sheet-like substrate toward the supporting substrate. Therefore, it is possible to provide an optical control device capable not only of achieving a velocity matching between the microwave and the optical wave and an impedance matching of the microwaves but also operating at a high speed.

Moreover, the second electrode is disposed in the signal input/output portion via the low dielectric constant layer at a position which is away from the sheet-like substrate toward the supporting substrate. In this case, the electrostatic capacitance of the control electrode in the signal input/output portion increases, resulting in the increase of impedance and the impedance matching between the control electrode in the optical modulator and the signal path such as a coaxial cable that introduces microwaves into the optical control device.

Moreover, it is possible to provide the optical control device which can operate stably and suppress a rise in temperature of the optical control device owing to the above-mentioned reduction in driving voltage, and further to provide the optical control device which can use a low-driving-voltage driving device which is inexpensive.

According to the invention of claim 5, since the optical waveguide is the ridged optical waveguide, an optical confinement factor becomes higher and it is possible to concentrate an electric field generated by the control electrode into the optical waveguide. Therefore, it is possible to realize the optical control device which operates in a lower driving voltage.

According to the invention of claim 6, since the buffer layer is formed at least between the sheet-like substrate and the first electrode, it is possible to dispose the control electrode much closer to the optical waveguide while suppressing a propagation loss of the optical wave propagating through the optical waveguide.

According to the invention of claim 7, since the signal electrode and the ground electrode are configured by either a transparent electrode or an electrode where a transparent electrode is disposed on the sheet-like substrate, it is possible to dispose the control electrode much closer to the optical waveguide while suppressing a propagation loss of the optical wave propagating through the optical waveguide, even when there is no buffer layer.

According to the invention of claim 8, since the low dielectric constant film is filled in recesses which are disposed on at least both sides of the ridged waveguide, it is possible to adjust the refractive index or the impedance of a microwave in the control electrode, and thus a further appropriate refractive index or impedance of the microwave can be obtained.

According to the invention of claim 9, a spontaneous polarization of the sheet-like substrate including at least a portion of the optical waveguide is reversed in the optical control device according to any one of claims 1 to 7. Therefore, a differential driving of the optical control device can be easily realized by a simple control electrode or a driving circuit, and thus it is possible to reduce the driving voltage.

BEST MODE FOR IMPLEMENTING THE INVENTION

Figure 1:
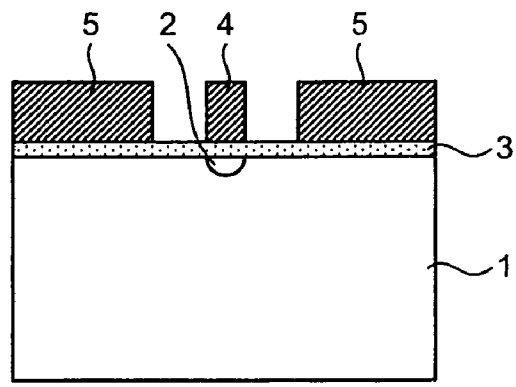
FIG. 1 is a view illustrating an example of a conventional optical control device.
Figure 2:
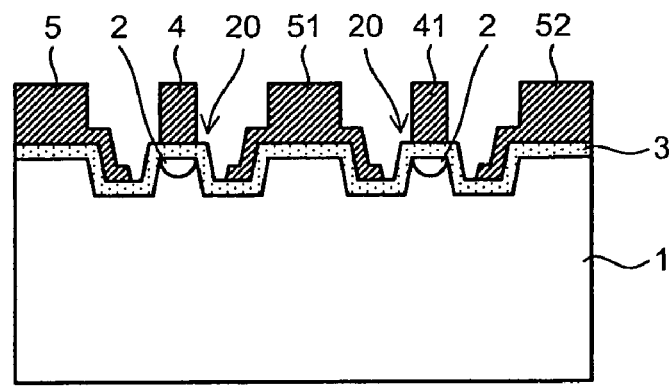
FIG. 2 is a view illustrating an example of the conventional optical control device.
Figure 3:
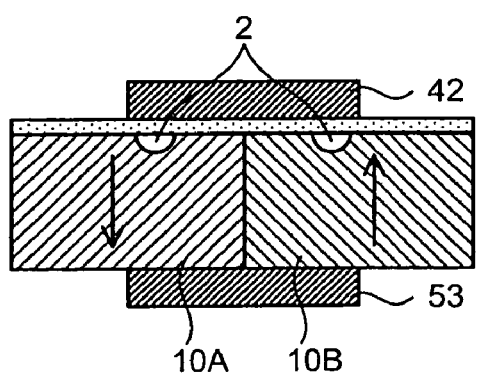
FIG. 3 is a view illustrating an example of the conventional optical control device.
Figure 4:
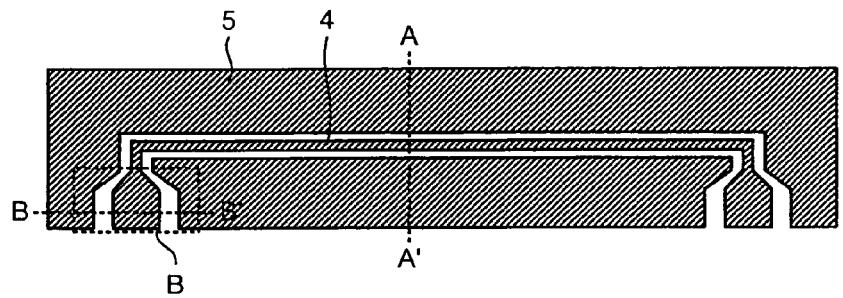
FIG. 4 is a top plan view illustrating an example of an optical control device according to the present invention.
Figure 5:
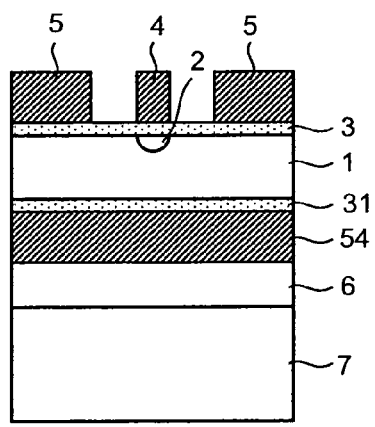
FIG. 5 is a cross sectional view of the optical control device in FIG. 4, taken along line A-A.
Figure 6:
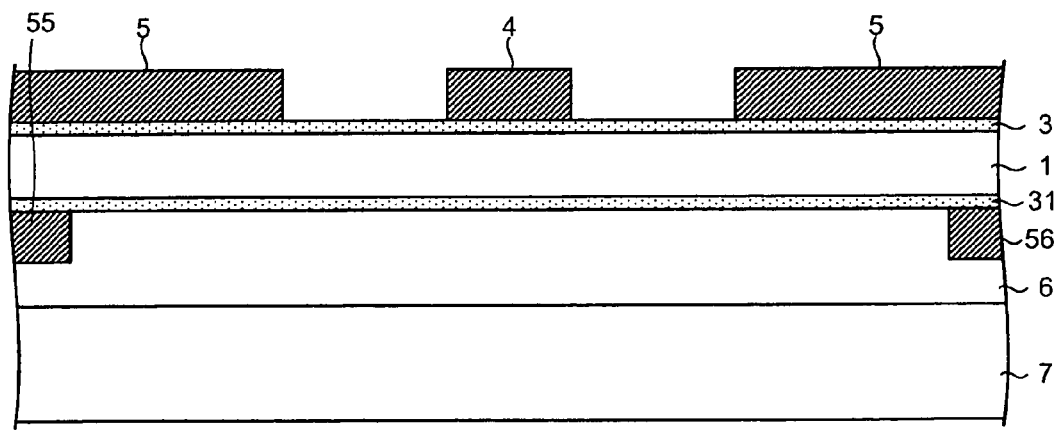
FIG. 6 is a cross sectional view of the optical control device in FIG. 4, taken along line B-B.

FIG. 4 is a top plan view illustrating an example of an optical control device according to the present invention; FIG. 5 is a cross sectional view of a modulation region portion of the optical control device, taken along line A-A; and FIG. 6 is a cross sectional view of a signal input/output portion of the optical control device, taken along line B-B. The modulation region is a region where a signal electrode and a ground electrode are generally arranged in parallel and opposite to each other so that a substantial modulation is performed on an optical wave (optical signal) propagating in an optical waveguide. The signal input/output portion is a region which is depicted by a broken line in the drawings, for example, and which is bonded to an external coaxial cable or the like.

In this example, a case where a sheet-like substrate on which an optical waveguide is to be formed is configured by a Z-cut substrate is illustrated, and only a main part of the optical control device is illustrated.

As illustrated in FIGS. 4 to 6, an optical waveguide 2 is formed in a Z-cut substrate (sheet-like substrate 1) such that control electrodes are disposed so as to interpose the sheet-like substrate 1 therebetween. The control electrodes include a first electrode which is disposed on an upper side of the sheet-like substrate 1 and a second electrode which is disposed on a lower side of the sheet-like substrate 1. The first electrode includes a signal electrode 4 and a ground electrode 5, and the second electrode includes a ground electrode 54. It goes without saying that the first and second electrodes may appropriately include additional necessary electrodes such as a DC electrode other than the illustrated electrodes. Moreover, the sheet-like substrate 1 is supported on a supporting substrate 7 via an adhesive layer 6.

The optical control device illustrated in FIGS. 4 to 6 is characterized in that in the modulation region portion, not only an electric field through the signal electrode 4 and the ground electrode 5, but also an electric field through the signal electrode 4 and the ground electrode 54 are applied to the optical waveguide 2. According to this configuration, it is possible to increase the intensity of the electric field in a vertical direction of the optical waveguide 2 illustrated in the drawing, and thus to reduce the driving voltage. Moreover, since a refractive index and an impedance of a microwave in the control electrode are determined by the signal electrode 4 and the ground electrodes 5 and 54, it is possible to set the impedance value to 50Ω while realizing a refractive index of 2.14 that is an optimal value for the microwave, for example.

The first electrode is disposed via a buffer layer 3 such as a $SiO_2$ film which is disposed between the first electrode and the sheet-like substrate 1. The buffer layer has an effect that prevents optical waves propagating in the optical waveguide from being absorbed or scattered by the control electrode. In addition, as a configuration of the buffer layer, a Si film or the like can also be formed integrally if necessary in order to reduce the pyroelectric effect of the sheet-like substrate 1.

Moreover, the second electrode (the ground electrode 54) is configured such that a void portion is defined in a region of the signal input/output portion including a portion just below the signal electrode 4 of the first electrode so that the ground electrode 54 does not exist in the region. Therefore, since the adhesive layer 6 is disposed in the void portion in lieu of the ground electrode 54, the electrostatic capacitance of the control electrode composed of the first and second electrodes in the signal input/output portion increases, resulting in the increase of impedance. Thus, the impedance in the signal input/output portion can be made to approach to 50Ω as close as possible which is the generally used impedance value. Accordingly, it is possible to facilitate the impedance bonding matched with an external coaxial cable or the like.

The width of the void portion needs to correspond to at least the width of the portion right below the signal electrode 4, and may be appropriately increased from the said width depending on the degree of impedance matching.

In other words, according to the optical control device of the present embodiment, it is possible to provide an optical control device capable not only of achieving a velocity matching between the microwave and the optical wave and an impedance matching of the microwaves but also achieving a reduction in driving voltage. Moreover, it is possible to provide the optical control device which can operate stably and suppress a rise in temperature of the optical control device owing to the reduction in driving voltage, and further to provide the optical control device which can use a low-driving-voltage driving device which is inexpensive. Furthermore, it is possible to achieve an impedance matching between the signal path such as a coaxial cable for introducing the microwave into the optical control device and a control electrode in the optical modulator.

The sheet-like substrate 1 is bonded to the supporting substrate 7 via the adhesive layer 6 after the second electrode is formed. Therefore, even when the thickness of the sheet-like substrate 1 is 10 µm or less, it is possible to secure sufficient mechanical strength for the optical control device. The adhesive layer 6 functions also as a low dielectric constant layer. Therefore, when the adhesive layer (the low dielectric constant layer) 6 is made thick, since the distance between the signal electrode and the ground electrode increases, the inter-electrode capacitance decreases and the impedance increases. For example, when the width of the signal electrode is 100 µm and the width of the ground electrode 140 µm, the thickness of the sheet-like substrate is required to be 25 µm or less in order to obtain an impedance of 30 to 60Ω. Moreover, the same statement can be applied to a case where a layer different from the adhesive layer, such as a $SiO_2$ layer, is used as the low dielectric constant layer.

Figure 7:
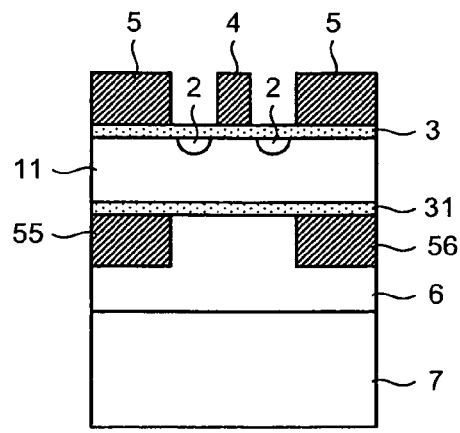
FIG. 7 is a view illustrating a modified example of the optical control device illustrated in FIGS. 4 to 6.

FIG. 7 is a cross sectional view corresponding to FIG. 5, of the optical control device when an X-cut substrate is used, in which the direction where the efficiency of the electro-optical effect is high corresponds to a horizontal direction in the drawing. For this reason, the signal electrode 4 and the ground electrode 5 are disposed in the first electrode at such a position as interposing the optical waveguide 2, and in the second electrode, the shape and arrangement of the ground electrodes 55 and 56 are determined such that the electric field formed by the signal electrode 4 and the ground electrodes 55 and 56 has a horizontal component with respect to the optical waveguide 2. As will be described later, by configuring the second electrode as a patterned electrode in accordance with the shape of the optical waveguide, it is possible to form greater optimum electric field distribution.

In the present embodiment, the thickness of the sheet-like substrate 1 is 10 µm or less so that not only the electric field through the signal electrode 4 and the ground electrode 5, but also the electric field through the signal electrode 4 and the ground electrode 54 can be sufficiently applied to the optical waveguide 2. Although the lower limit of the thickness of the sheet-like substrate 1 is not limited, it is set to 0.7 µm, for example. If the sheet-like substrate is thinner than 0.7 µm, it is difficult to form the optical waveguide 2 having a sufficient size.

As a crystalline substrate having an electro-optical effect used for the sheet-like substrate, lithium niobate, lithium tantalite, PLZT (lead lanthanum zirconate titanate), or quartz-based material, or a combination of these materials can be used, for example. It is particularly preferable to use crystalline lithium niobate (LN) or lithium tantalite (LT) due to their high electro-optical effect.

As a method of manufacturing the optical waveguide, it is possible to form the optical waveguide by diffusing Ti or the like on a substrate surface by means of thermal diffusion or proton exchange. In addition, as described in Patent Document 5, it is possible to form the optical waveguide by forming a ridge structure on the surface of the sheet-like substrate 1 commensurate with the shape of the optical waveguide.

The control electrode such as the signal electrode or the ground electrode can be formed through the formation of an electrode pattern of Ti/Au and a plated gold film, etc. In addition, for a transparent electrode to be described later, an ITO film or a compound oxide film of In and Ti which is an infrared-transparent conductive film is available. Further, the transparent electrode can be formed through the formation of the electrode pattern using photolithography technique and then using lift-off technique, or the formation of the electrode pattern using a mask member is formed such that a predetermined electrode pattern is left and then using dry etching or wet etching (see Patent Document 5).

In a method of manufacturing the sheet-like substrate 1 including the optical control device, the above-mentioned optical waveguide is formed on a substrate having a thickness of several hundreds μm, and a rear surface of the substrate is polished, so that the sheet-like substrate having a thickness of 10 μm or less is prepared. Thereafter, a control electrode is formed on a top surface of the sheet-like substrate. Alternatively, it is also possible to polish the rear surface of the substrate after forming the optical waveguide, the control electrode and the like. There may be a risk of damage to the sheet-like substrate when the sheet-like substrate undergoes a thermal impact during the formation of the optical waveguide or a mechanical impact due to handling of the sheet-like film during various processes. Therefore, it is preferable that a process that is likely to involve these thermal or mechanical impacts is performed before the substrate is polished to obtain the sheet-like substrate.

Various materials can be used for the supporting substrate 7. For example, in addition to using the same material as the sheet-like substrate, it is possible to use materials having a lower dielectric constant than the sheet-like substrate, such as quartz, glass, or alumina, or materials having a different crystal orientation from the sheet-like substrate. However, in order to stabilize the modulation characteristics of the optical control device with respect to temperature variation, it is preferable to select and use materials having a linear expansion coefficient equivalent to that of the sheet-like substrate. To the contrary, in a case where it is difficult to select the equivalent material, a material having a linear expansion coefficient equivalent to that of the sheet-like substrate is selected and used for an adhesive for bonding the sheet-like substrate and the supporting substrate.

The sheet-like substrate 1 and the supporting substrate 7 may be bonded by using various adhesive materials as the adhesive layer 6, such as epoxy-based adhesive, thermosetting adhesive, ultraviolet curable adhesive, solder glass, or a thermosetting, a light curable or a light-induced viscosity resin adhesive sheet.

Figure 8:
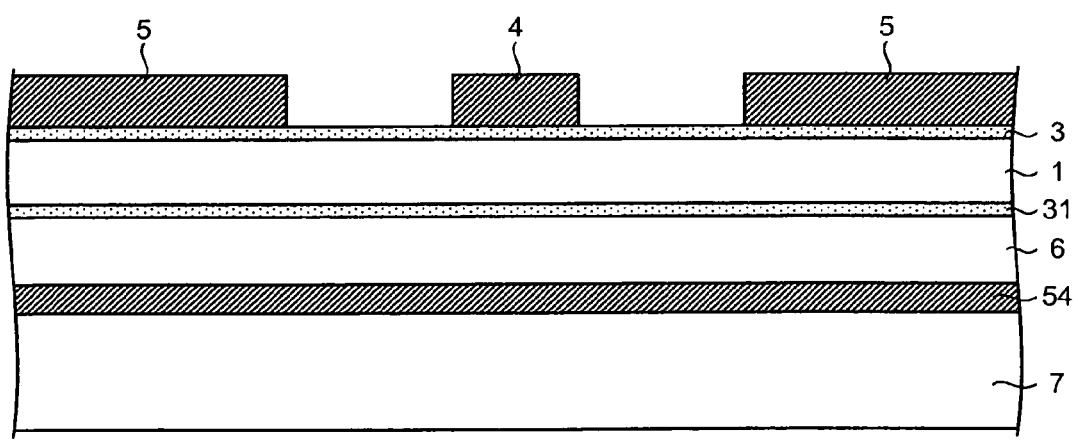
FIG. 8 is a view illustrating a modified example of the optical control device illustrated in FIGS. 4 to 6.

FIG. 8 is a cross sectional view illustrating a main part of a modified example of the optical control device illustrated in FIGS. 4 to 6. The cross sectional view illustrated in FIG. 8 corresponds to that of FIG. 6, which is the cross sectional view of the signal input/output portion according to the above-described embodiment. In this example, the signal input/output portion is configured to have the ground electrode 54 between the supporting substrate 7 and the adhesive layer 6. Therefore, since the adhesive layer 6 is disposed between the first electrode and the second electrode in the signal input/output portion, the electrostatic capacitance of the control electrode composed of these electrodes increases, resulting in the increase of impedance and the impedance matching between the control electrode in the optical modulator and the signal path such as a coaxial cable which introduces microwaves into the optical control device.

To obtain the above-mentioned operational effects more effectively, the thickness of the adhesive layer 6 is preferably 50 μm or more. Although the upper limit of the thickness of the adhesive layer 6 is not particularly limited, the upper limit may be 200 μm, for example.

Figure 9:
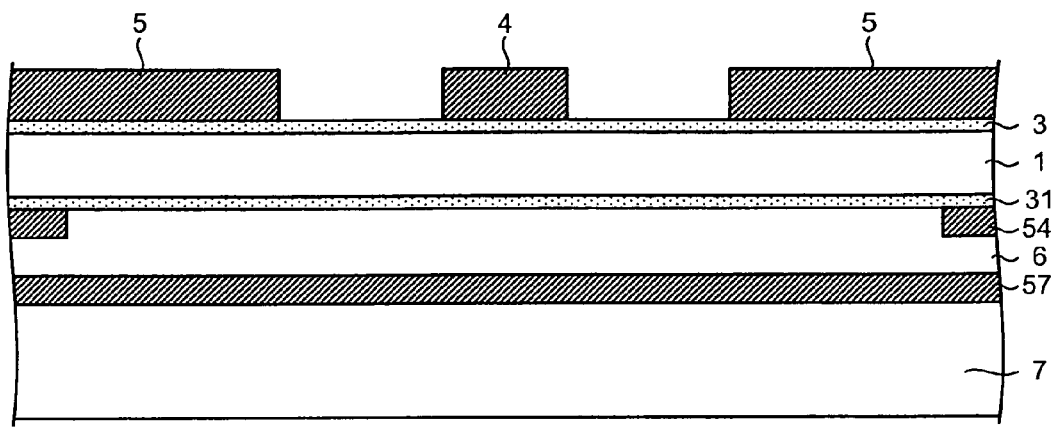
FIG. 9 is a view illustrating a modified example of the optical control device illustrated in FIGS. 4 to 6.

FIG. 9 is a cross sectional view illustrating a main part of another modified example of the optical control device illustrated in FIGS. 4 to 6. The cross sectional view illustrated in FIG. 9 corresponds to that of FIG. 6, which is the cross sectional view of the signal input/output portion according to the above-described embodiment. In this example, a void portion is defined in a region of the signal input/output portion including a portion just below the signal electrode 4 of the first electrode so that the ground electrode 54 does not exist in the region. Moreover, an additional ground electrode 57 is provided between the supporting substrate 7 and the adhesive layer 6.

Therefore, since the adhesive layer 6 is disposed in the void portion of the signal input/output portion in lieu of the ground electrode 54 to be disposed between the additional ground electrode and the first electrode, the electrostatic capacitance of the control electrode composed of the first and second electrodes in the signal input/output portion increases, resulting in the increase of impedance. Thus, the impedance in the signal input/output portion can be made to approach to 50Ω as close as possible which is the generally used impedance value. Accordingly, it is possible to facilitate the impedance bonding matched with an external coaxial cable or the like.

Hereinafter, applications of the optical control device according to the present invention will be described. In the following drawings, when the same members as the above-mentioned members are used, they are referenced by the same reference numeral if possible, and the adhesive layer or the supporting substrate is omitted, as necessary, in order to describe the characteristics of the configuration clearly. Moreover, in order to prevent the description from becoming redundant, the applications of the embodiments illustrated in FIGS. 4 to 6 will be described. Moreover, the following applications are related to the modulation region portion of the optical control device, the following drawings are cross sectional views corresponding to FIG. 5 of the above-described embodiments.

(Optical Control Device Using Ridged Waveguide)

Figure 10:
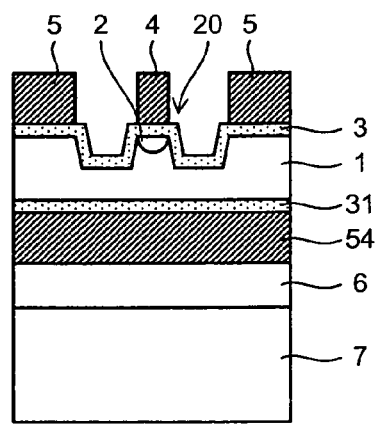
FIG. 10 is a view illustrating an example of a ridge-type optical control device according to the present invention.
Figure 11:
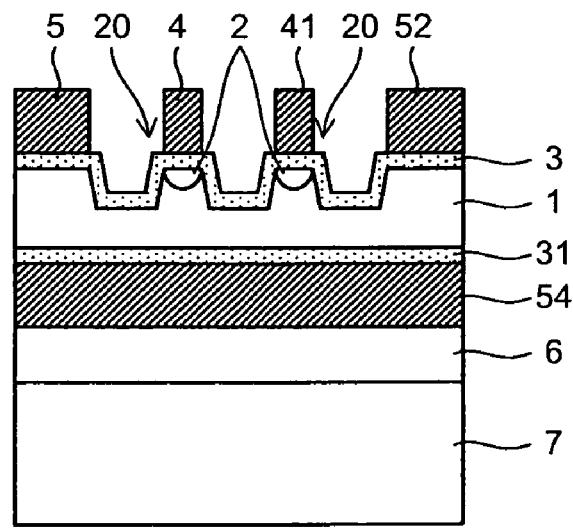
FIG. 11 is a view illustrating an example of a ridge-type optical control device according to the present invention.
Figure 12:
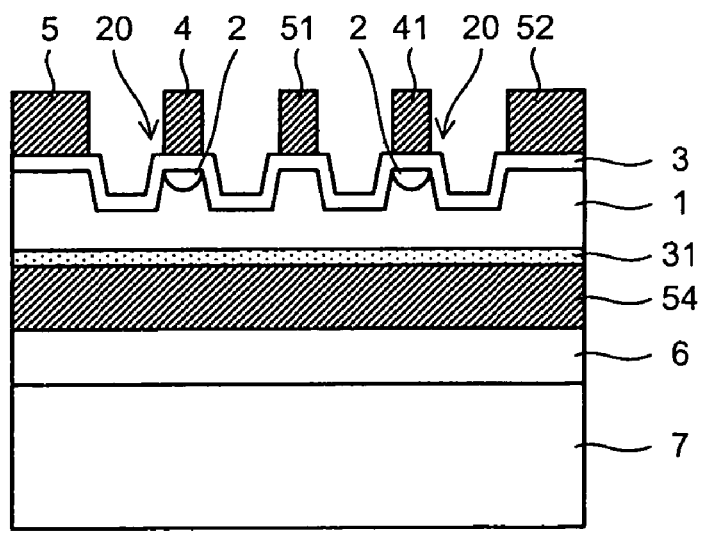
FIG. 12 is a view illustrating an example of a ridge-type optical control device according to the present invention.

FIGS. 10 to 12 illustrate an application of the optical control device illustrated in FIGS. 4 to 6, which is an example of where the optical waveguide is formed by a ridged waveguide. Since the optical waveguide is formed as the ridged optical waveguide, an optical confinement factor becomes higher and it is possible to concentrate an electric field generated by the control electrode into the optical waveguide. Therefore, it is possible to realize the optical control device which operates in a lower driving voltage.

As illustrated in FIG. 10, the optical waveguide of the optical control device is formed by a ridged waveguide 20, whereby the optical wave propagating in the optical waveguide is confined in the ridge portion 20. The electric field generated by the signal electrode 4 and the ground electrode 5 and the electric field generated by the signal electrode 4 and the ground electrode 54 are intensively applied to the ridge portion 20, leading to the contribution to a reduction in driving transmission of the optical control device.

FIG. 11 illustrates that two optical waveguides 2 are formed as ridged waveguides 20. The signal electrodes 4 and 41 are disposed commensurate with the ridged waveguides, respectively, and signals of opposite directions are applied to the signal electrodes, respectively. For example, when an attention is paid to the left ridge portion 20, the electric field generated by the signal electrode 4 and the ground electrode 5, the electric field generated by the signal electrode 4 and the ground electrode 54, and the electric field generated by the signal electrode 4 and the signal electrode 41 are intensively applied to the left ridge portion 20.

FIG. 12 illustrates that two optical waveguides 2 are formed as the ridged waveguides 20, and a ridge portion corresponding to the ground electrode 51 is formed between the two optical waveguides. The signal electrodes 4 and 41 are disposed commensurate with the ridged waveguides 20, respectively, and independent signals are applied to the signal electrodes, respectively.

For example, when an attention is paid to the left ridge portion 20, the electric field generated by the signal electrode 4 and the ground electrode 5, the electric field generated by the signal electrode 4 and the ground electrode 54, and the electric field generated by the signal electrode 4 and the ground electrode 51 are intensively applied to the left ridge portion 20.

(Optical Control Device Having Low Dielectric Constant Film)

Figure 13:
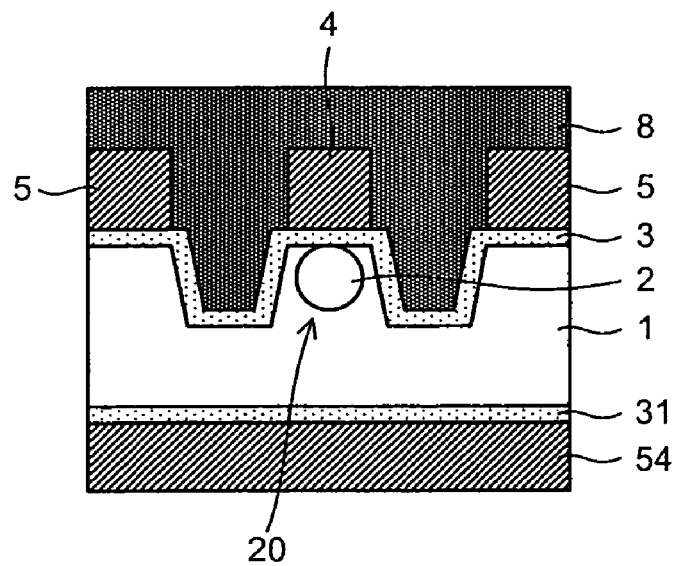
FIG. 13 is a view illustrating an example of an optical control device having a low dielectric constant film.

FIG. 13 illustrates another application of the optical control device illustrated in FIGS. 4 to 6, which is an example of where a low dielectric constant film is disposed in a recess that forms the ridged waveguide and between the signal electrode 4 and the ground electrode 5 which constitute the first electrode. With this arrangement of the low dielectric constant film, it is possible to adjust the refractive index or the impedance of a microwave in the control electrode, and to increase the degree of flexibility in wiring of the control electrode.

As materials of the low dielectric constant film, benzocyclobutene (BCB) or the like can be used, and as a method of manufacturing the low dielectric constant film, a coating method can be used.

As illustrated in FIG. 13, a low dielectric constant film 8 can be formed so as to cover recesses formed on both sides of the ridged waveguide 20, portions between the signal electrode 4 and the ground electrode 5, or the first electrode.

(Optical Control Device Where Optical Waveguide is Formed on Rear Surface Side of the Sheet-Like Substrate)

Figure 14:
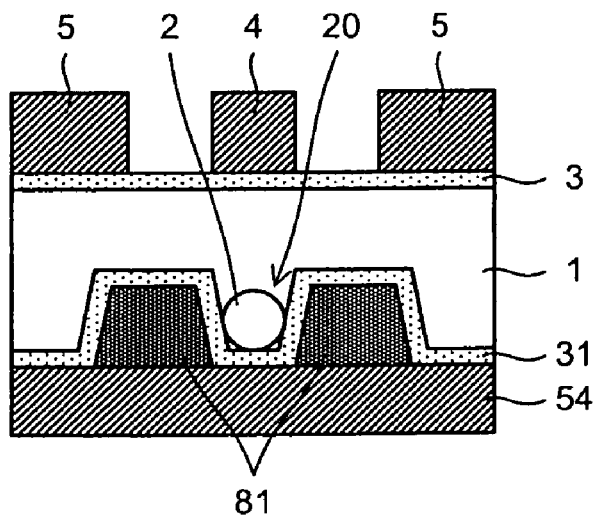
FIG. 14 is a view illustrating an example of an optical control device where an optical waveguide is formed on a rear surface side of a sheet-like substrate.
Figure 15:
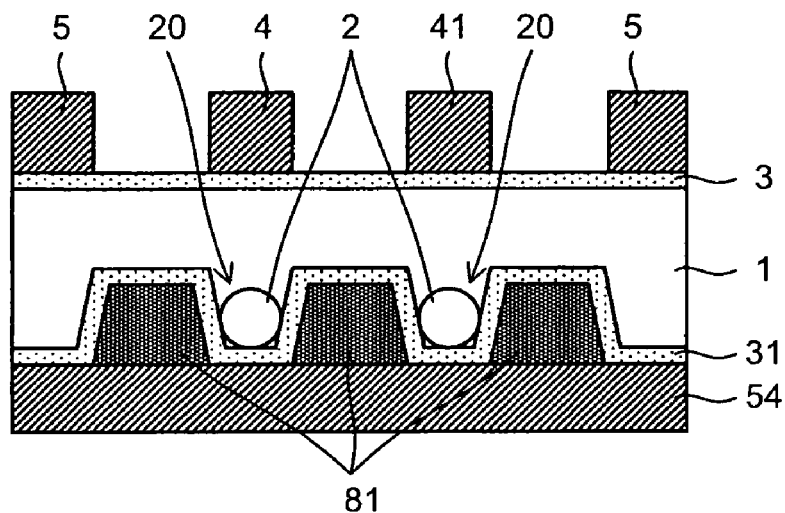
FIG. 15 is a view illustrating an example of an optical control device where an optical waveguide is formed on a rear surface side of a sheet-like substrate.

FIGS. 14 and 15 illustrate a further application of the optical control device illustrated in FIGS. 4 to 6, which is an example of where the optical waveguide 2 (the ridged waveguide 20) is formed on the rear surface (the lower side in the drawing) of the sheet-like substrate 1. When the sheet-like substrate having a thickness of 10 μm or less is used, as illustrated in FIG. 14, the optical waveguide 2 is formed on the rear surface of the sheet-like substrate 1, and the signal electrode 4 and the ground electrode 5, which are the first electrode, are formed on the top surface of the sheet-like substrate. Further, the ground electrode 54, which is the second electrode, is formed on the rear surface of the sheet-like substrate 1. With the above-mentioned structure, it is possible to apply an electric field, especially the electric field generated by the signal electrode 4 and the ground electrode 54, to the ridge portion 20.

FIG. 15 illustrates an example of where two signal electrodes 4 and 41 are used, in which the left ridge portion 20 is applied with the electric field generated by the signal electrode 4 and the ground electrode 54, and the right ridge portion 20 is applied with the electric field generated by the signal electrode 41 and the ground electrode 54.

In addition, a low dielectric constant film 81 may be formed in the recesses which form the ridge portions 20, if necessary.

In the case of the optical control device illustrated in FIGS. 10 to 12, it is necessary accurately to arrange the signal electrode 4 or 41 on the top of the ridge portion of the ridged waveguide. However, in the case of the optical control device illustrated in FIGS. 14 and 15, it is possible to provide an advantage that the electric field can be effectively applied to the ridge portion only by setting the width of the signal electrode 4 or 41 to be equal to or greater than that of the ridged waveguide, even when a small positional deviation occurs between them.

(Optical Control Device Using Transparent Electrode)

FIGS. 16 to 19 illustrate a still further application of the optical control device illustrated in FIGS. 4 to 6, which is an example of where transparent electrodes 9 and 91 to 94 are used as the electrode. By using either a transparent electrode or an electrode where a transparent electrode is disposed on the sheet-like substrate as the signal electrode or the ground electrode, it is possible to dispose the control electrode much closer to the optical waveguide and to reduce the driving voltage while suppressing a propagation loss of the optical wave propagating through the optical waveguide, even when there is no buffer layer.

Figure 16:
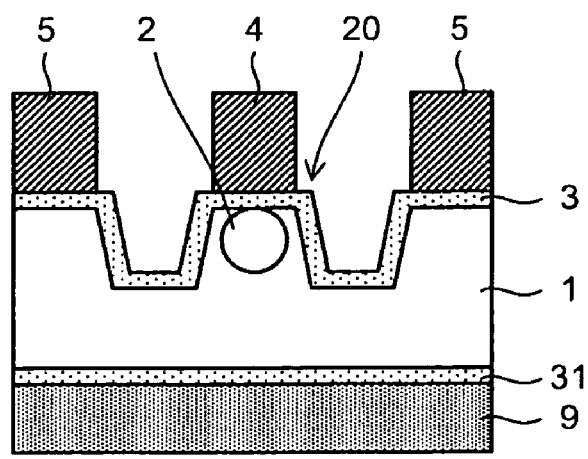
FIG. 16 is a view illustrating an example of an optical control device that uses a transparent electrode.
Figure 17:
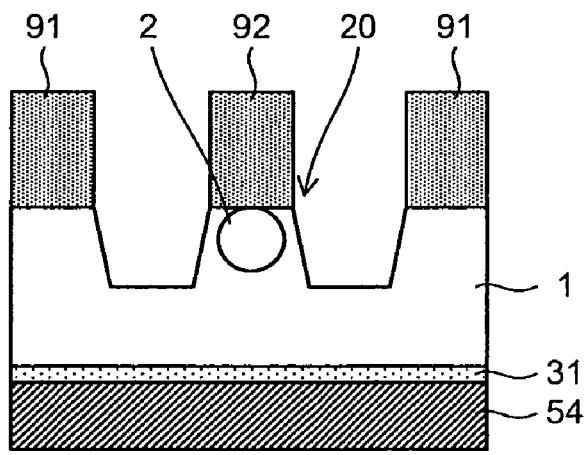
FIG. 17 is a view illustrating an example of an optical control device that uses a transparent electrode.

FIG. 16 illustrates an example of where a transparent electrode 9 is used as the ground electrode of the second electrode, and FIG. 17 illustrates an example of where transparent electrodes 91 and 92 are used as the first electrode. In these cases, a buffer layer 3 illustrated in FIG. 16 is not necessary, and it is possible to dispose the electrode closer to the optical waveguide. In addition, the ground electrode (the transparent electrode 91) constituting the first electrode illustrated in FIG. 17 may be formed by a general metal electrode because there is no optical waveguide in the vicinity of the electrode.

Figure 18:
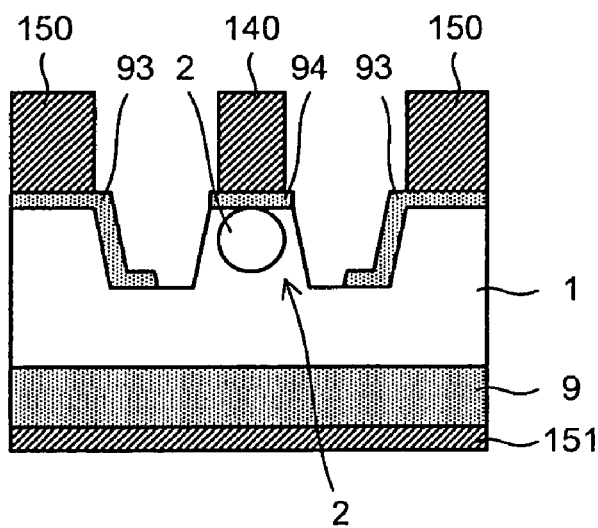
FIG. 18 is a view illustrating an example of an optical control device that uses a transparent electrode.

FIG. 18 illustrates an example of where the transparent electrode is used in a part (a side being in contact with the sheet-like substrate 1 or 11) of the control electrode. In general, since the transparent electrode has a high electrical resistivity compared to the metal electrode of Au or the like, it is possible to dispose the metal electrodes 140, 150, and 151 so as to be in contact with the transparent electrodes 9 or 93 to 96 for the purpose of reducing an electrical resistance of an electrode. In addition, it is also possible to dispose the transparent electrode close to the ridged waveguide or on a side surface of the ridged optical waveguide as indicated by reference numeral 93 or 95 and 96, and to allow the electric field to act on the waveguide extremely and effectively.

Figure 19:
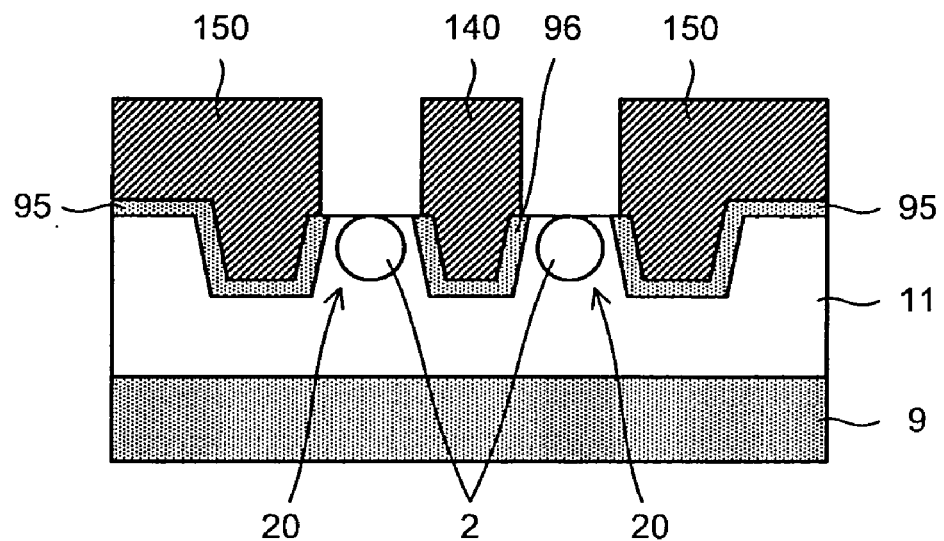
FIG. 19 is a view illustrating an example of an optical control device that uses a transparent electrode.

Although FIG. 18 illustrates an example of where a Z-cut substrate is used as the sheet-like substrate, FIG. 19 illustrates an example of where an X-cut substrate is used as the sheet-like substrate, for the purpose of reference. The same reference numerals denote the same members, and the same operational effects as those of the case illustrated in FIG. 18 can be obtained.

(Optical Control Device Using Patterned Electrode as Second Electrode)

Figure 20:
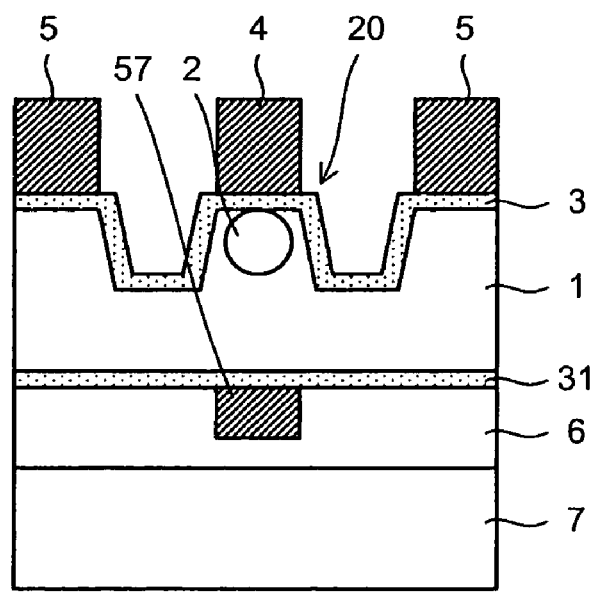
FIG. 20 is a view illustrating an example of an optical control device where a patterned electrode is used as a second electrode.

FIG. 20 illustrates another application of the optical control device illustrated in FIGS. 4 to 6, which is an example of where the ground electrode that forms the second electrode is formed as a patterned electrode. Since the second electrode is formed as the patterned electrode commensurate with the shape of the optical waveguide, it is possible to adjust the shape of the electric field applied to the optical waveguide to a more appropriate shape, and to reduce the driving voltage much more.

Figure 21:
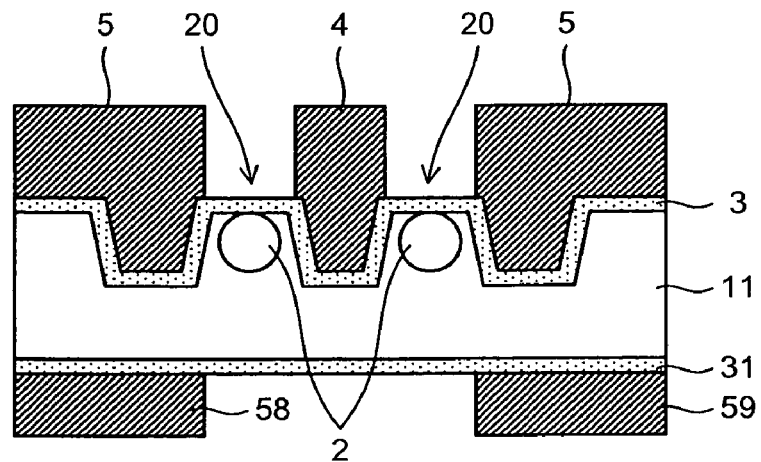
FIG. 21 is a view illustrating an example of an optical control device where a patterned electrode is used as a second electrode.

In FIG. 20, the ground electrode 57 is formed as an electrode having a strip shape that extends along the optical waveguide 2 so that the electric field generated by the signal electrode 4 and the ground electrode 57 is further concentrated into the optical waveguide 2. Although FIG. 20 illustrates an example of where a Z-cut substrate is used as the sheet-like substrate, FIG. 21 illustrates an example of where an X-cut substrate is used as the sheet-like substrate, for the purpose of reference. The same reference numerals denote the same members, and the same operational effects as those of the case illustrated in FIG. 20 can be obtained.

(Optical Control Device Using Polarization Reversal)

Figure 22:
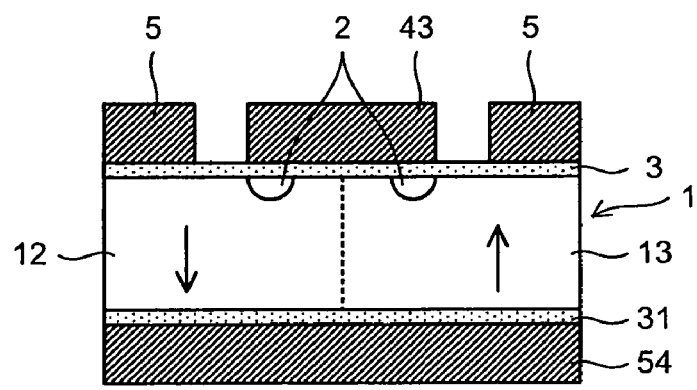
FIG. 22 is a view illustrating an example of an optical control device that uses a polarization reversal.
Figure 23:
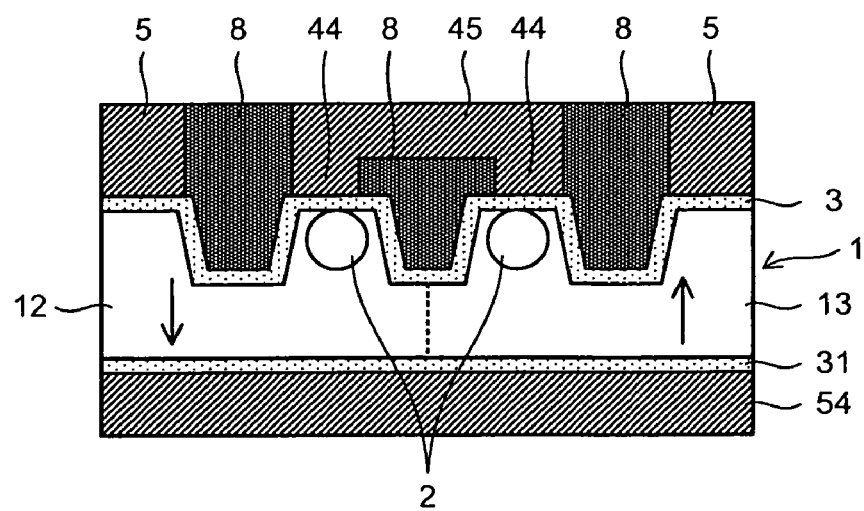
FIG. 23 is a view illustrating an example of an optical control device that uses a polarization reversal.

FIGS. 22 and 23 illustrate a further application of the optical control device illustrated in FIGS. 4 to 6, which is an example of where the sheet-like substrate 1 is polarized reversely. Since the spontaneous polarization of the sheet-like substrate 1 including at least a portion of the optical waveguide is reversed, a differential driving of the optical control device can easily be realized by a simple control electrode or a driving circuit, and thus it is also possible to reduce the driving voltage.

In FIG. 22, spontaneous polarizations of opposite directions (indicated by the arrows in the drawing) occur in substrate regions 12 and 13 of the sheet-like substrate 1. The signal electrode 43 constituting the first electrode is able to apply a common electric field to the optical waveguides 2 which are formed in the substrate regions 12 and 13, respectively. Since the directions in polarization of the substrate regions are different from each other with respect to the optical waveguides, the phase changes of the optical waves propagating in the corresponding optical waveguides are reversed, leading to the possibility of obtaining the same effect as that in the differential driving.

FIG. 23 illustrates an example of where the directions of polarization in the substrate regions 12 and 13 of the sheet-like substrate 1 are adjusted to be different, and a ridged optical waveguide is used. The same signal electrodes 44 are used for applying the electric field to the two ridged waveguides 20, and the two signal electrodes 44 are electrically connected by a connection path 45. Moreover, the low dielectric constant film 8 is formed in the recesses that form the ridged waveguides or between the signal electrode and the ground electrode 5.

Example

In this example, the optical control device as illustrated in FIGS. 4 to 6 was manufactured. In this case, the ground electrode 54 was not formed in the signal input/output portion. In the signal input/output portion, the width of the signal electrode 4 was set to 100 μm, and the gap between the signal electrode and the ground electrode 5 was set to 140 μm. Moreover, the thickness of the sheet-like substrate 1 was set to 4 μm, and the thickness of the buffer layer 3 was set to 3 μm. Furthermore, the respective electrodes were formed of Au, and the sheet-like substrate 1 was formed by a Z-cut lithium niobate (LiNbO$_3$) substrate, and the buffer layer 3 was formed by a SiO$_2$ layer. As a result, the impedance value in the signal input/output portion was about 43Ω.

In addition, when the ground electrode was formed so as to include the lower portion of the signal electrode 4 in the signal input/output portion, the impedance value was about 4Ω. Therefore, according to the optical control device of this example, it is possible easily to achieve a connection in a state where an impedance matching with an external coaxial cable or the like is achieved.

INDUSTRIAL APPLICABILITY

According to the optical control device of the present invention, it is possible to provide an optical control device capable not only of achieving a velocity matching between the microwave and the optical wave and an impedance matching of the microwaves but also achieving a reduction in driving voltage. Moreover, it is possible to provide the optical control device which can operate stably and suppress a rise in temperature of the optical control device owing to the reduction in driving voltage, and further to provide the optical control device which can use a low-driving-voltage driving device which is inexpensive. Furthermore, it is possible to achieve an impedance matching between a signal path such as a coaxial cable for introducing the microwave into the optical control device and a control electrode in the optical modulator.

The invention claimed is:

1. An optical control device, comprising:
    a sheet-like substrate which has an electro-optical effect and has a thickness of 10 μm or less;
    an optical waveguide formed on the sheet-like substrate; and
    a control electrode for controlling light passing through the optical waveguide, wherein the control electrode is comprised of a first electrode and a second electrode which are arranged so as to interpose the sheet-like substrate so that the first electrode includes a coplanar electrode which is composed of at least a signal electrode and a ground electrode and the second electrode is configured to include at least a ground electrode in a modulation region of the optical control device so that an electric field is applied to the optical waveguide by the signal electrode of the first electrode and the ground electrode of the second electrode, and
    wherein the second electrode is not disposed in at least a lower portion of the signal electrode of the first electrode in a signal input/output portion of the optical control device.

2. The optical control device according to claim 1, wherein the sheet-like substrate is supported on a supporting substrate via a low dielectric constant layer; and an additional ground electrode is disposed in the signal input/output portion via the low dielectric constant layer at a position which is away from the second electrode toward the supporting substrate.

3. The optical control device according to claim 1, wherein the second electrode and the additional ground electrode are separated by 50 μm or more.

4. An optical control device, comprising:
    a sheet-like substrate which has an electro-optical effect and has a thickness of 10 μm or less;
    an optical waveguide formed on the sheet-like substrate; and configured as a ridged optical waveguide,
    a control electrode for controlling light passing through the optical waveguide,
    wherein the control electrode is comprised of a first electrode and a second electrode which are arranged so as to interpose the sheet-like substrate so that the first electrode includes a coplanar electrode which is composed of at least a signal electrode and a ground electrode and the second electrode is configured to include at least a ground electrode in a modulation region portion of the optical control device so as to apply an electric field to the optical waveguide in cooperation with the signal electrode of the first electrode,
    wherein the second electrode is disposed in the signal input/output portion via a low dielectric constant layer at a position which is away from the sheet-like substrate toward the supporting substrate.

5. The optical control device according to claim 4, wherein the sheet-like substrate is supported on a supporting substrate via a low dielectric constant layer; and an additional ground electrode is disposed in the signal input/output portion via the low dielectric constant layer at a position which is away from the second electrode toward the supporting substrate.

6. The optical control device according to claim 4, wherein the second electrode and the additional ground electrode are separated by 50 μm or more.

7. An optical control device comprising:
    a sheet-like substrate which has an electro-optical effect and has a thickness of 10 μm or less;

an optical waveguide formed on the sheet-like substrate; and configured as a ridged optical waveguide, a control electrode for controlling light passing through the optical waveguide, wherein the control electrode is comprised of a first electrode and a second electrode which are arranged so as to interpose the sheet-like substrate so that the first electrode includes a coplanar electrode which is composed of at least a signal electrode and a ground electrode and the second electrode is configured to include at least a ground electrode in a modulation region of the optical control device so as to apply an electric field to the optical waveguide in cooperation with the signal electrode of the first electrode, wherein the second electrode is not disposed in at least a lower portion of the signal electrode of the first electrode in a signal input/output portion of the optical control device.

8. The optical control device according to claim 7, wherein the sheet-like substrate is supported on a supporting substrate via a low dielectric constant layer; and an additional ground electrode is disposed in the signal input/output portion via the low dielectric constant layer at a position which is away from the second electrode toward the supporting substrate.

9. The optical control device according to claim 7, wherein the second electrode and the additional ground electrode are separated by 50 μm or more.

* * * * *